Jan. 18, 1938.　　　A. W. MALL　　　2,106,034
RAIL GRINDER
Filed Oct. 1, 1936　　　10 Sheets-Sheet 1
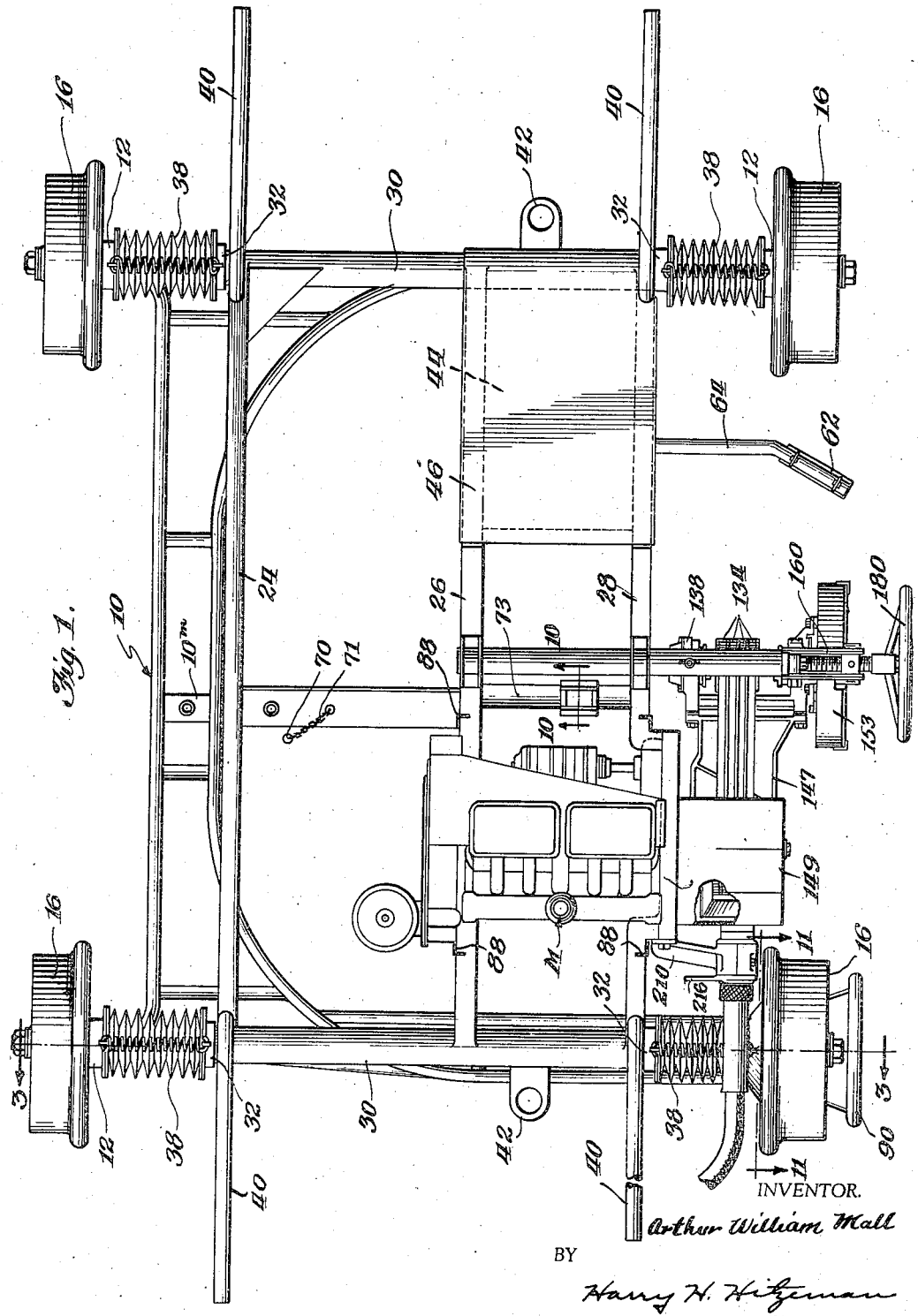
INVENTOR.
Arthur William Mall
BY
Harry H. Hitzeman
ATTORNEY.

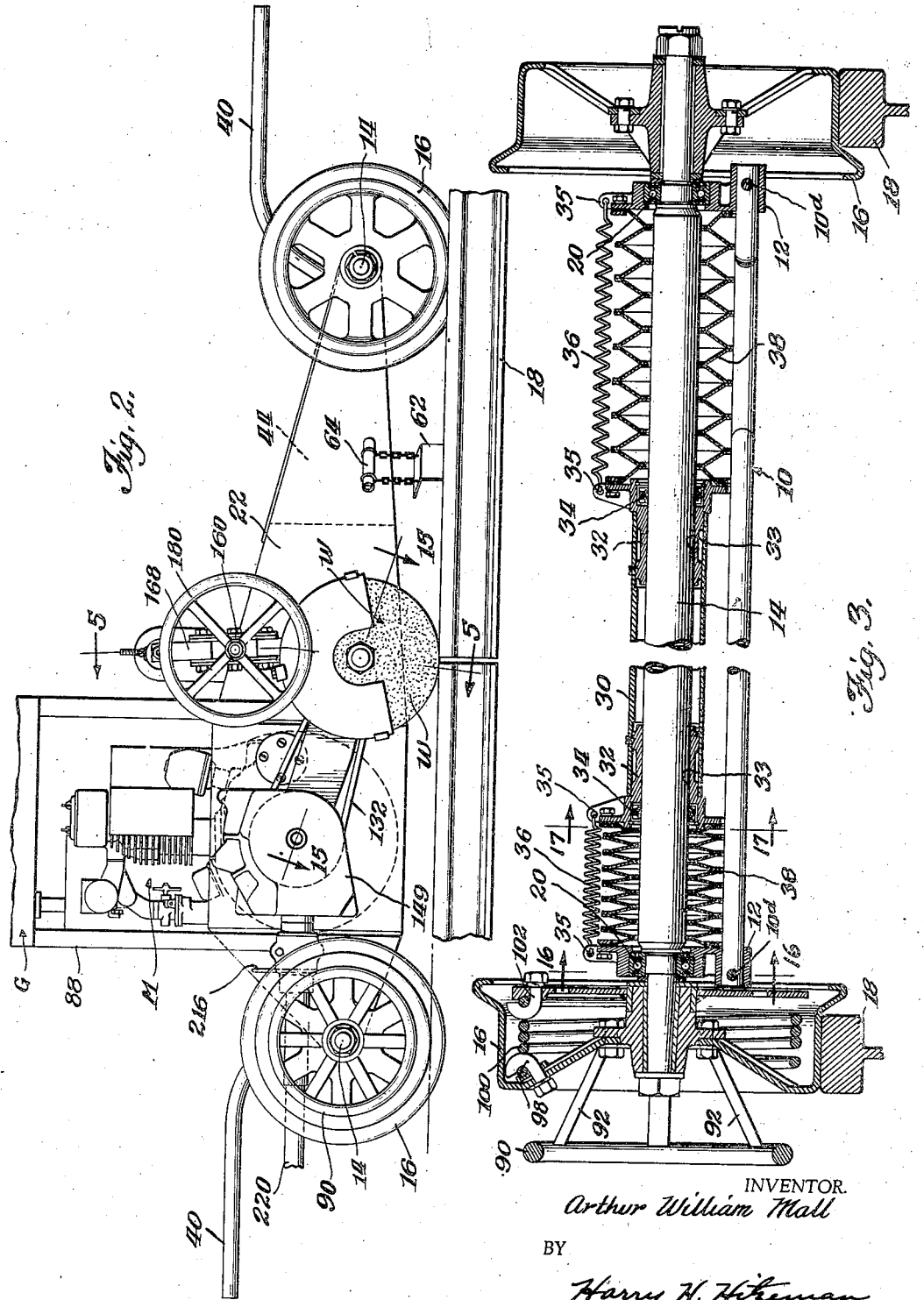

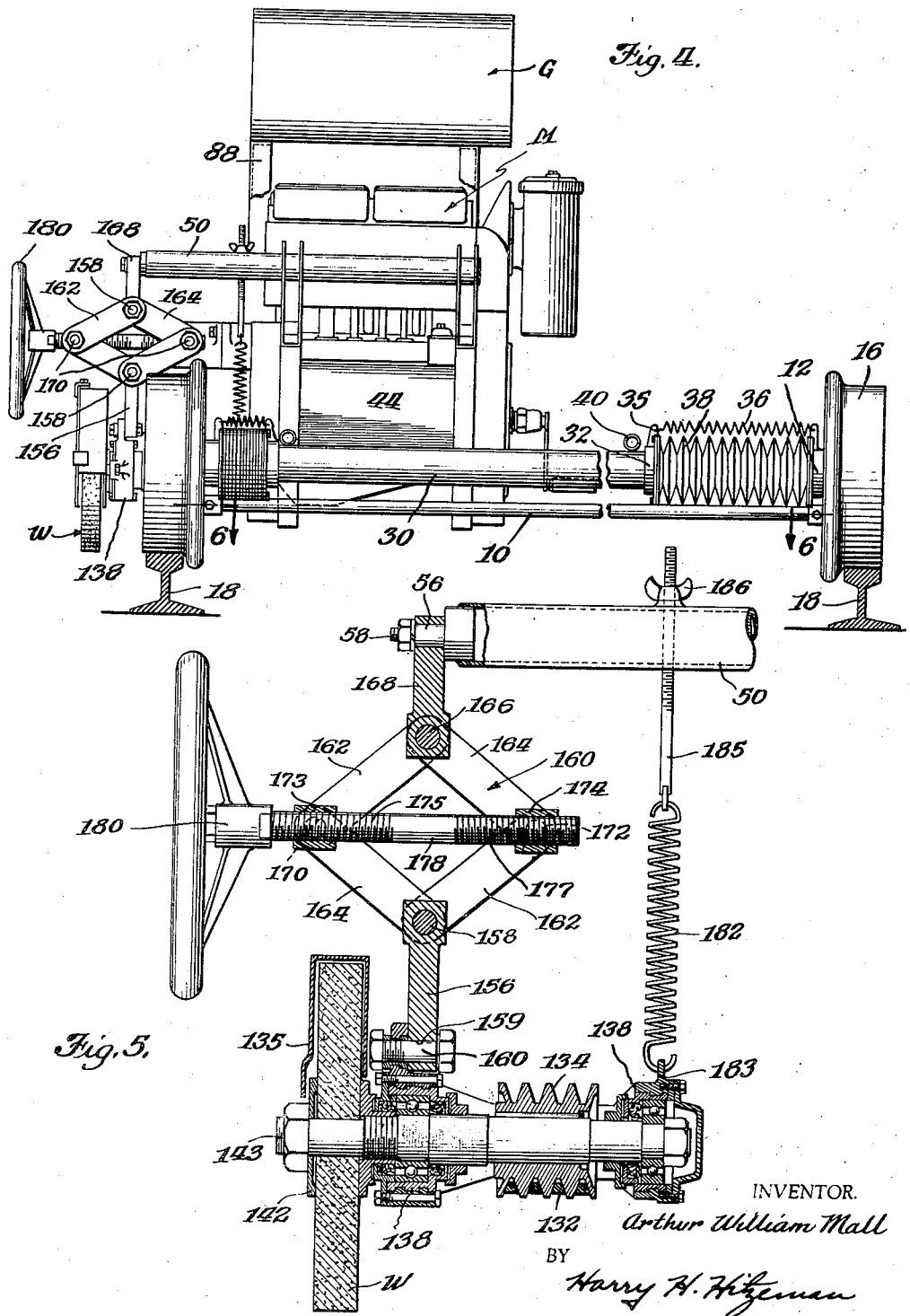

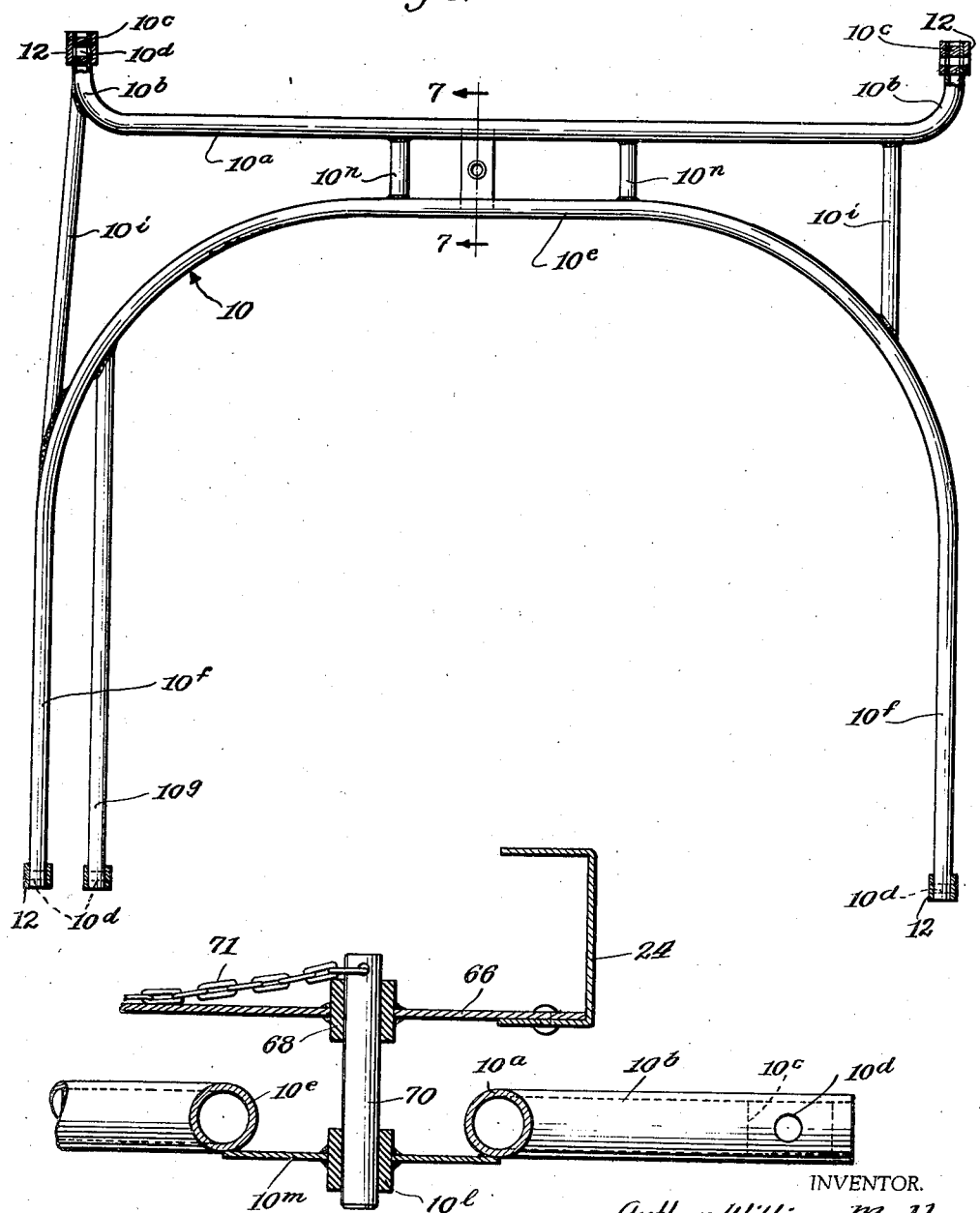

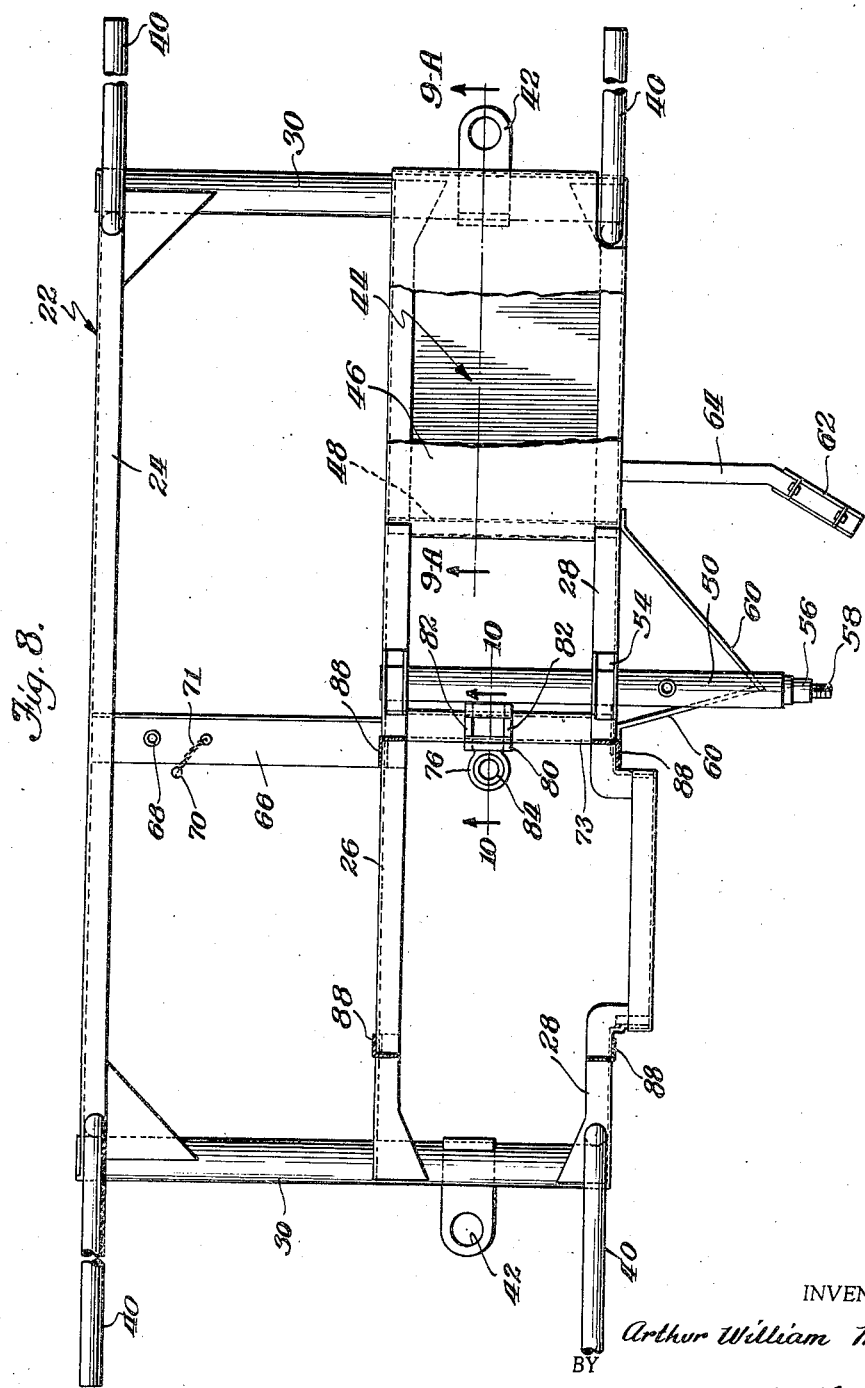

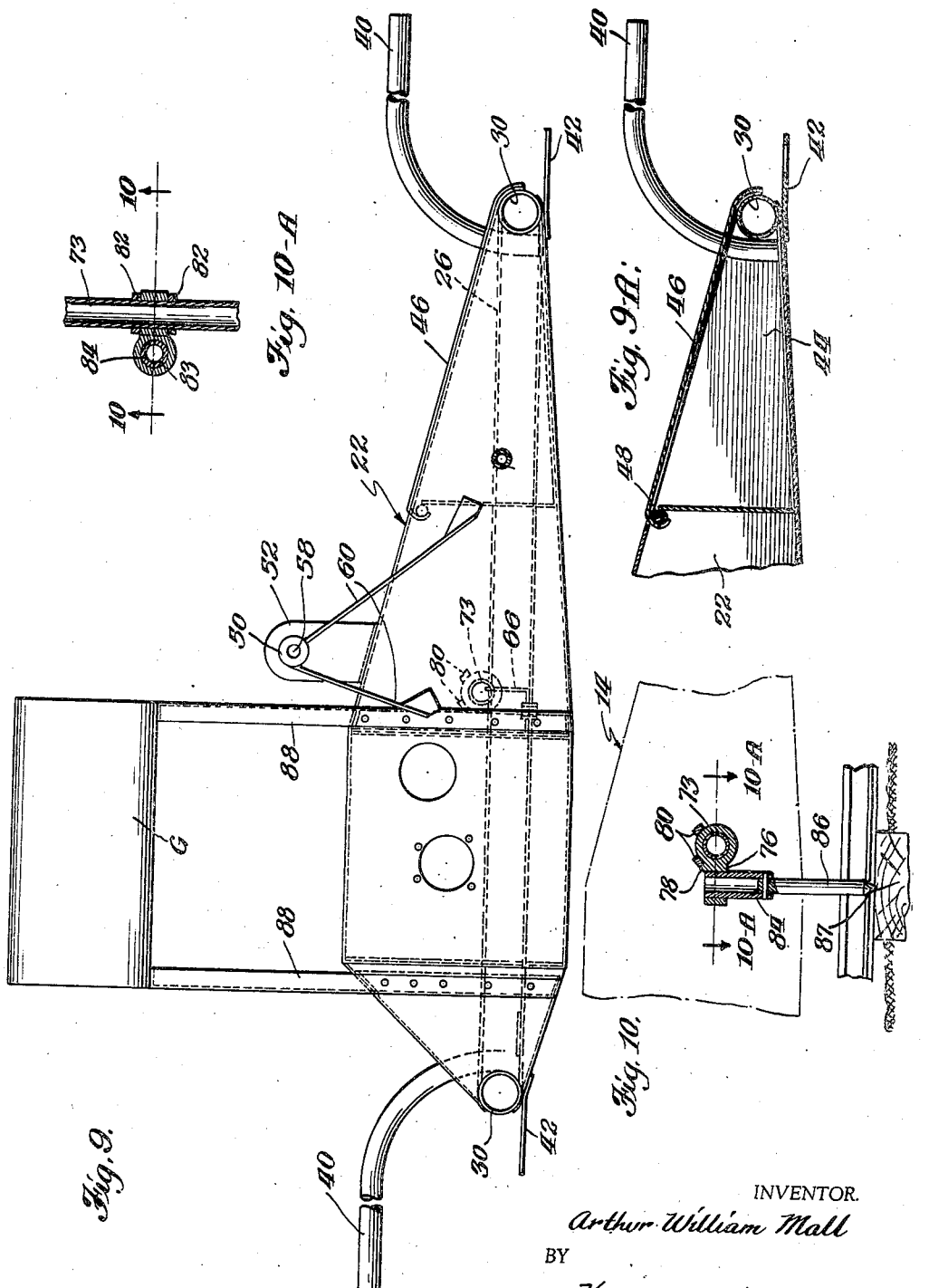

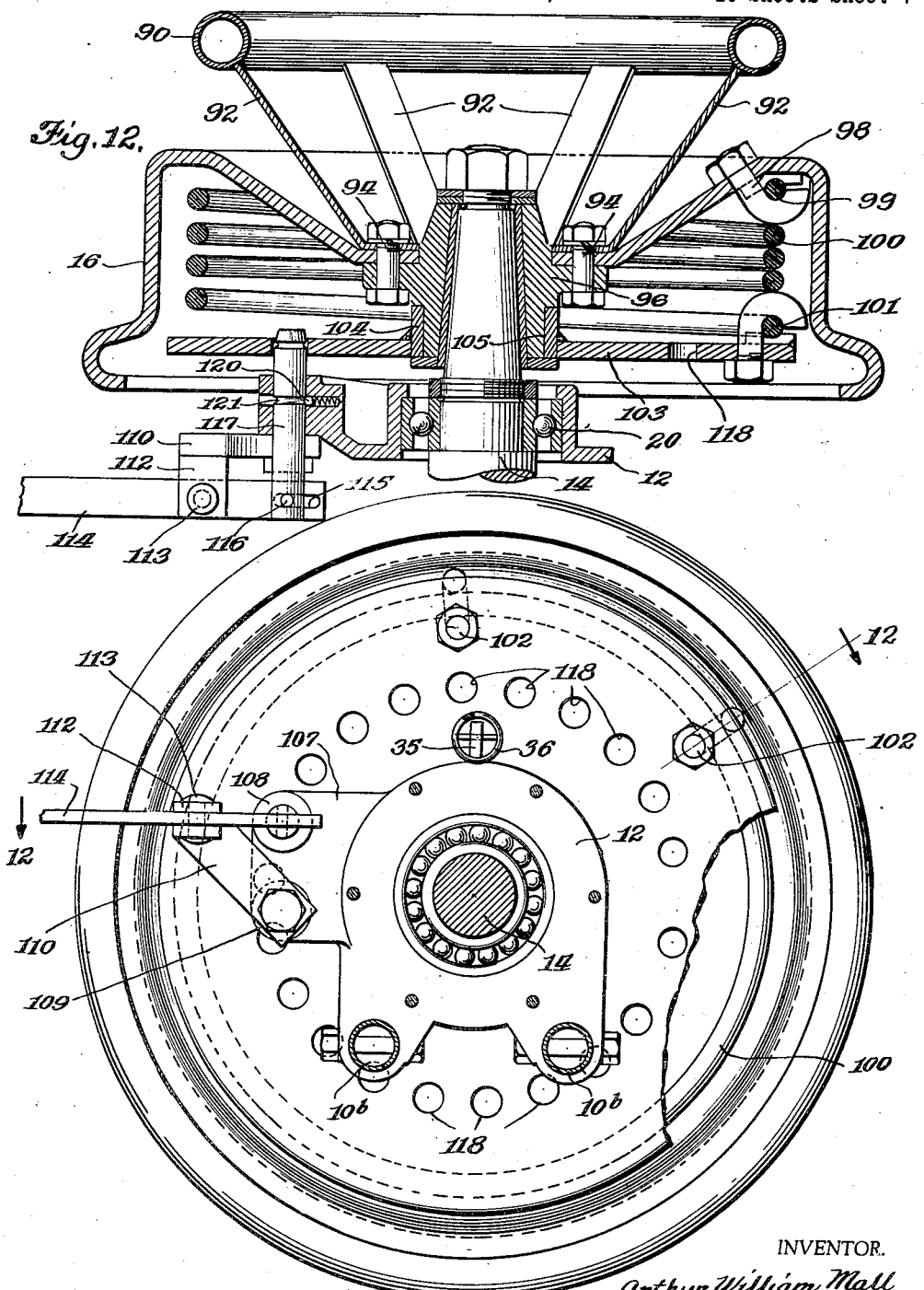

Jan. 18, 1938.  A. W. MALL  2,106,034
RAIL GRINDER
Filed Oct. 1, 1936   10 Sheets-Sheet 8
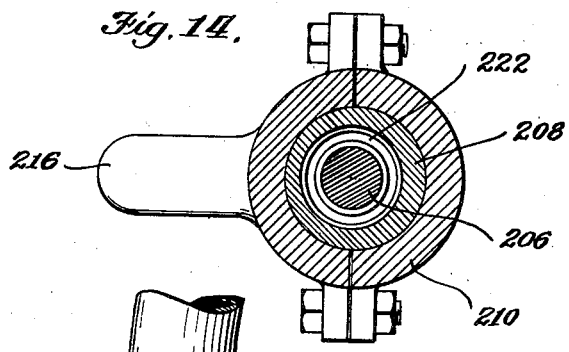
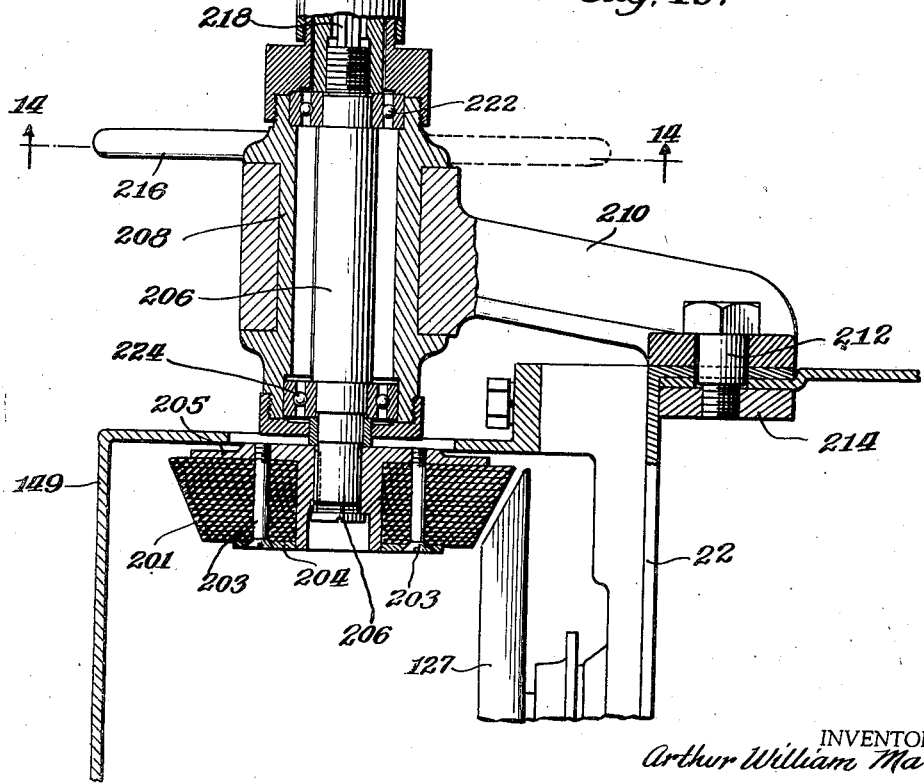
INVENTOR.
Arthur William Mall
BY
Harry H. Hitzeman
ATTORNEY.

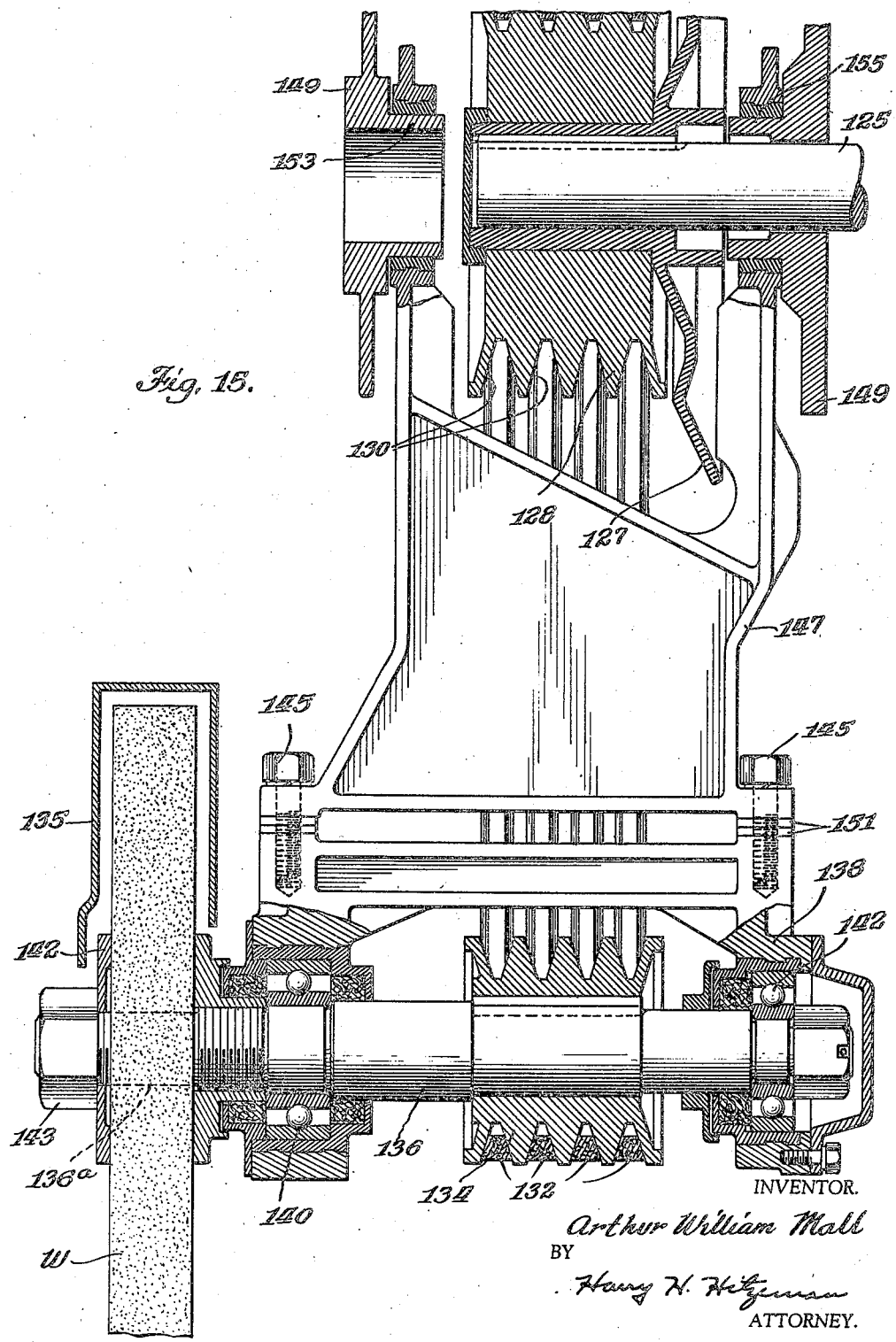

Jan. 18, 1938.   A. W. MALL   2,106,034
RAIL GRINDER
Filed Oct. 1, 1936   10 Sheets—Sheet 10
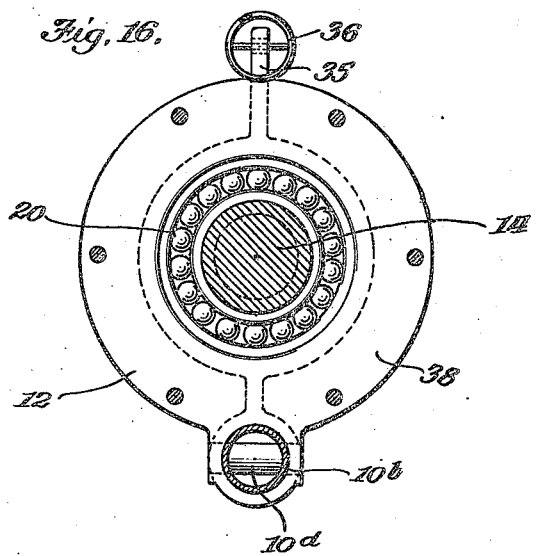
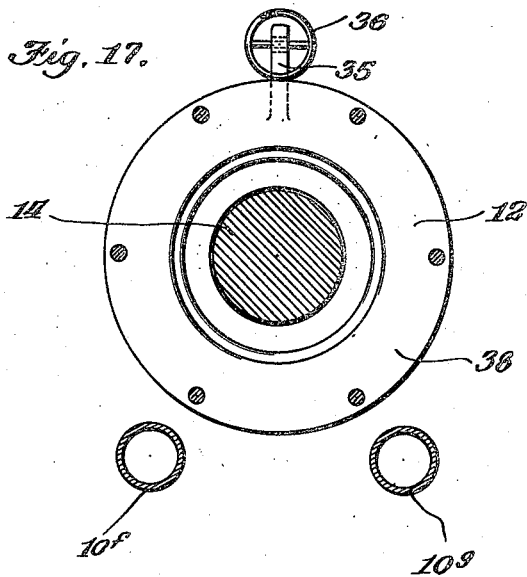

Patented Jan. 18, 1938

2,106,034

UNITED STATES PATENT OFFICE 2,106,034

RAIL GRINDER

Arthur William Mall, Chicago, Ill.

Application October 1, 1936, Serial No. 103,497

21 Claims. (Cl. 51—178)

The invention relates to improvements in apparatus for surfacing or grinding rails for railway tracks.

The electrical art method of welding rails has now come into general use on both electrical and steam railroads. An electrical weld, however, leaves a roughened surface, thus necessitating the use of suitable apparatus for resurfacing the rails. For this purpose it has been proposed to employ a portable grinding machine mounted upon the track.

These machines generally comprise a frame supporting a motor and an adjustable grinding wheel mounted thereon and driven by the motor.

In machines of this type, several features of construction are highly desirable from the standpoint of efficiency of operation as well as reduction of cost and reduction of labor required. For example, it is highly desirous in a machine of the type described to be able to operate the grinder upon one rail of the track and then by as little effort as possible pivot the machine and swing it around to be able to grind the other rail.

In view of the fact that most of the machines for this purpose carry a grinding wheel which is narrower than the width of the rail to be ground, it is necessary to move the grinding wheel back and forth over the width of the rail to grind the same. Thus, it is desirable to have the wheel so mounted that the same is easily movable back and forth. Of necessity, the grinding wheel must also be raised and lowered to come in contact with the surface of the rail and to grind to a depth sufficient for the purpose, and no further. It is desirable that mechanism for this purpose be as easily operative as possible. In addition to the above movements of the grinding wheel, the same is necessarily oscillated back and forth longitudinally upon the rail to grind down the complete roughened surface left by the electric weld. It is desirable to be able to move the grinding wheel back and forth with a minimum of effort.

With these and other objects in mind, the principal object of the present invention is to provide an improved, high speed track grinder of the portable type, capable of riding upon the rails of the railroad to be ground and equipped with a single abrasive or grinding wheel.

A further object of the invention is to provide in a machine of the type described an improved structure whereby the grinding wheel and associated parts may be laterally moved during a grinding operation.

A further object of the invention is to provide improved apparatus for moving the grinding wheel in a vertical direction during a grinding operation.

A further object of the present invention is to provide improved inertia operated means for moving the grinding wheel to and fro longitudinally of the rail during a grinding operation.

A further object of the invention is to provide an improved construction in a machine of this type whereby the entire machine, including the frame and driving motor and associated parts, is so arranged that the entire machine is moved transversely of the track during the lateral movement of the grinding wheel across the face, and the entire machine is moved to and fro in conjunction with the grinding wheel during the longitudinal movement of the grinding wheel on the track.

A further object of the present invention is to provide an improved construction whereby the above described motion is easily accomplished by a single operator who is operating the grinding wheel and whereby the motions are assisted by compression springs.

A further object of the present invention is to provide an improved and simplified pivot member so arranged that the entire machine can be easily pivoted and swung around to move the grinding wheel from one rail to another.

A further object of the invention is to provide an improved frame construction that is comparatively light yet sufficiently rigid to support the heavy motor required, and one capable of easy lateral movement upon the axles of the wheel truck upon which the same is mounted.

A further object of the invention is to provide an improved construction of axle and frame whereby a comparatively light yet sufficiently rigid construction is provided for the heavy duty for which the machine is constructed.

A further object is to provide improved means for locking the frame in an inoperative position during movement of the machine to and from places of work.

A further object is to provide an improved drive means associated with the motor on the machine whereby a flexible shaft take-off may be associated therewith for driving a supplemental grinding wheel or other tool.

A further object is to provide an improved inertia controlling spring member capable of assisting in the reciprocation of the machine longitudinally of the track.

A further object is to provide an improved toggle motion mechanism and charge spring for reducing to a minimum the effort required in raising and lowering the grinding wheel during its operation, and take up back lash due to wear.

A further object is to provide an improved, rigid steel frame construction capable of supporting a motor in such a manner that the same is rigidly held in position, yet easily removable for repair or replacement.

Other objects and advantages will be more apparent from the following description wherein reference is had to the accompanying ten sheets of drawings upon which Fig. 1 is a plan view of the complete machine;

Fig. 2 is a side elevational view thereof looking from the side upon which the grinding wheel is located;

Fig. 3 is a vertical sectional view through one of the axles and wheels, taken generally on the line 3—3 of Fig. 1;

Fig. 4 is a front elevational view of the machine;

Fig. 5 is a vertical sectional view taken generally on the line 5—5 of Fig. 2, showing the grinding wheel and toggle and spring raising and lowering mechanism therefor;

Fig. 6 is a plan sectional view taken generally on the line 6—6 of Fig. 4, showing the auxiliary or slide control frame which is mounted directly beneath the reciprocal frame;

Fig. 7 is a vertical sectional view taken generally on the line 7—7 of Fig. 6, showing the manner in which the reciprocal frame is locked in a non-operative position to the rigid slide control frame;

Fig. 8 is a plan view of the machine frame;

Fig. 9 is a side elevational view thereof;

Fig. 9—A is a cross-sectional view taken on the line 9A—9A of Fig. 8 showing the tool box built into the motor frame;

Fig. 10 is a cross-sectional view taken generally on the line 10—10 of Fig. 1, Fig. 8 or Fig. 10A showing the improved pivot member for swinging the machine around to work upon a different rail;

Fig. 10—A is a detail section on the line 10A—10A of Fig. 10;

Fig. 11 is a sectional view taken generally on the line 11—11 of Fig. 1, showing the manner in which the inertia spring is mounted in one of the wheels;

Fig. 12 is a sectional view thereof taken generally on the line 12—12 of Fig. 11;

Fig. 13 is a plan sectional view showing generally the manner in which the flexible drive take-off is connected with the motor drive;

Fig. 14 is a cross-sectional view taken on the line 14—14 of Fig. 13;

Fig. 15 is a horizontal sectional view taken generally on the line 15—15 of Fig. 2 illustrating the drive for the grinding wheel and associated parts;

Fig. 16 is a vertical cross-sectional view taken generally on the line 16—16 of Fig. 3; and Fig. 17 is a similar cross-sectional view taken on the line 17—17 of Fig. 3.

The type of grinding machine hereinafter described is adapted for use by steam or electrical railroads in removing surplus metal disposed on the rails, for the purpose of levelling cupped joints and any other surface track work affected by arc welding and the like.

The machine generally comprises a sub-frame 10 provided with a plurality of bearing members 12 for supporting a pair of axles 14 upon which standard track wheels 16 may be journalled, and so positioned that they can be trained upon the standard rails 18 that are to be worked upon.

The frame 10 shown in details in Fig. 6, may be formed with a longitudinal bar 10a having a pair of parallel outwardly turned ends 10b within which a pair of studs 10c may be secured adjacent their open ends. Each of the studs 10c is provided with a bore 10d through which a stud may be positioned to secure the same in the axle bearings 12. The frame 10 is further constructed with the frame member 10e formed with a pair of parallel side portions 10f which are also provided with studs 10c at their ends to support bearings 12. A secondary reinforcing bar 10g is provided adjacent one of the members 10f to engage the bracket 12 which supports the spring inertia wheel 16 as will be more fully described hereinafter. The frame members 10a and 10e are secured together by braces 10i adjacent their outer extremities. These braces are welded or otherwise fixedly secured to the cross members to form a rigid unit. A pair of short braces 10n are provided intermediate the ends for the same purpose. A plate member 10m is adapted to be spot welded and secured between the braces 10a and 10e to support a small tubular member 10l which is provided to lock the motor frame in position, as will be hereinafter described.

The bearings 12 (see Fig. 3) are provided with ball bearing races 20 to support the wheel axles 14. The motor frame 22 (see Figs. 8 and 9) is constructed generally of sheet metal and includes the longitudinal channel members 24, 26 and 28. These members are secured together adjacent their ends by a pair of parallel axle housing members 30. Each of the axle members 30 is provided with bearing members 32 at their opposite end. The bearing members 32 are provided with horizontal bores 33 to slidably engage the axle 14, and have suitable lubricating pockets 34, provided with lubricant to permit easy sliding movement on the axle. Both the bearings 12 and the bearings 32 are formed with upright ears 35 to provide connections for a coiled spring 36 connected therebetween. I also provide extensible guards in the form of accordion type protection jackets 38 fastened between the opposite faces of the bearings 12 and 32 to at all times exclude dirt, dust and other material from the axles 14.

As thus far described it will be apparent that I have provided a rigid track wheel frame for supporting the axles upon which the wheels of the machine are mounted, and a motor frame mounted for horizontal movement back and forth upon the axles 14.

The motor frame may be provided with parallel handle members 40 adjacent both ends thereof so that the same may be grasped for movement at either end of the machine. A pair of towing bars 42 is secured to the axle housing 30 at the opposite ends of the machine by spot welding or otherwise. I provide a tool box 44 at the forward end of the machine between the channel members 28 and 26 and provide a cover 46 therefor pivotally mounted to swing upon a tubular member 48 secured between the channel members adjacent their upper end. A grinding wheel adjustment support in the form of a tubular member 50 is adapted to be mounted between a pair of U-members 52 and 54 positioned on the channels 26 and 28. The support may extend outwardly and carry a reduced shoulder portion 56 and a screw threaded portion 58. A pair of braces 60 may extend from the side of channel member 28 to give rigidity to the member 50.

A spark breaker 62, adapted to be suspended adjacent the grinding wheel later to be described, is pivotally suspended from the horizontal bar 64 extending outwardly from the frame member 28. I provide an angle member 66 which extends between the channel members 24 and 26 and carries a collar member 68. For locking the lower frame 10 and the motor frame 22 I provide a pin member 70 secured to the end of a chain 71 that is fastened on the angle iron 66. Thus when the two tubular members 68 and 107 are aligned the pin 70 may be dropped through the same and the frame 10 and the motor frame 22 are rigidly secured together and any movement between them is prevented.

Means are provided for raising the complete machine and pivoting the same so that the machine can be rotated through an arc of 180 degrees to bring the grinding wheel located on one side of the machine to the rail on the opposite side of the machine. These means may include a cross bar 73 positioned between the channel members 26 and 28. I mount a turning pedestal head 76 upon the tubular cross bar 73 in such a manner that the same is rotatable. The pedestal head is formed with a shoulder portion 78 adapted to abut against a cross bar 80 that is mounted upon a pair of spacers 82 which serve to position the pedestal head. The spacers 82 are fastened upon the bar 73 by welding. The pedestal head is formed with a vertical bore 83 within which a tubular post 84 is rigidly mounted, a foot member 86 having a pointed end 87 being fastened in the lower end of the member 84. As can be seen from the somewhat diagrammatic showing (Fig. 10), when the foot 86 is dropped and the entire machine pulled forward, the point 87 may engage in the top of a railroad tie, and as a result the entire machine will be lifted up from the rails upon the pivot so that the same may be rotated in the manner described. When not in use, the pivot may be swung upwardly and fastened in an inoperative position.

The motor M for driving the grinding wheel and other mechanism may be rigidly mounted in the motor frame described in such a manner that the same is easily removable by unfastening the bolts with which the same is secured in position so it can be repaired or replaced. I provide a gasoline tank G located above the motor on vertical angle members 88 which extend upwardly from the channels 26 and 28 to form a support therefor.

One of the important features of my improved construction is the provision of a unit which is capable of being moved longitudinally upon the rails. This is necessary in a grinding operation as the grinding wheel must be moved longitudinally across joints or other roughened surfaces of rails in order to smooth off the same. Accordingly, (on Figs. 11 and 12) I have shown a hand wheel 90 adapted to be secured to the exterior of one of the wheels 16 by suitable strap members 92. The strap members may have inwardly turned flattened portions with suitable openings so that bolt members 94 which pass through the flange of wheel 16 and a hub member 96 can fasten the same in position. The specially constructed wheels which are provided may have a hook bolt 98 fastened through the forward flange to secure one end 99 of a coiled spring member 100 rigidly in position. The other end 101 of the coiled spring may be held by a similar hook bolt 102 against the inner surface of a disc member 103 that has a hub portion 104 which rides upon a reduced shoulder 105 of the hub 96. The axle 14 may extend through and be journalled in a ball bearing member 20 in the bearing 12 which is secured as previously described to the frame 10. The bearing 12 may have a sidewardly extended flange 107 provided with a pair of bosses 108 and 109. A strap member 110 is adapted to be secured to the lower boss 109. The same extends upwardly and carries an arc member 112 which is provided with a pivot 113 for a lever 114. The lever 114 carries an elongated slot 115 at its outer end within which a pin 116 may extend. The pin 116 is mounted in the end of a reciprocable stud 117 which passes through the boss 108. The stud 117 is adapted to engage in one of the holes 118 in the disc 103. For this purpose a circular row of holes 118 is provided so that the same may engage in any one that can be brought into alignment in a desired position. A spring pressed ball 120 is adapted to engage in the groove 121 in the stud 117 to hold the same in an inner or outer locked position.

The operation of this inertia charged spring member will now be described. When it is desired to move the grinding wheel G longitudinally of the rail to be ground, it is accomplished by moving the entire apparatus, by turning on the hand wheel 90. By movement of the lever 114, pin 117 is moved forward and engages in one of the openings 118 in the disk 103, thus holding the same against rotation. Rotation of the hand wheel 90 and the wheel 16 will tend to wind up the spring 100 as the truck is moved backward a definite distance on the rails. Upon reversing the direction of movement of the truck, by turning the handle 90 in an opposite direction, the load spring 100 will greatly assist in this movement and thus the truck will be rolled forward and the spring unwound and then wound up in an opposite direction. Thus it can be seen that to and fro movement of the complete apparatus is greatly assisted by the inertia spring 100 which is wound up first clockwise and then counterclockwise to assist in the movement of the truck, thus making it comparatively easy for a single man to move the truck and grinding wheel back and forth, a job which previously had required the services of several men. It can also be seen that by the use of the inertia member a to and fro action is greatly accelerated due to the fact that there is no momentary pause at the end of each back and forward stroke during which it is necessary to start the load from a dead stop position manually.

The grinding wheel W is adapted to be driven from the motor M in the following manner: The motor shaft 125 may extend outwardly past the motor frame and carry a combined sheave and hub member 127 upon which a pulley 128 is adapted to be mounted in driving relation. The pulley 128 may have a plurality of grooves 130 within which a plurality of V-belts 132 are adapted to be geared. The V-belts 132 are trained about a similar pulley 134 secured to the grinding wheel shaft 136. This shaft is adapted to be mounted in a bracket 138 in suitable ballbearing members 140 and 142 carried thereby. The grinding wheel W is secured to the extended end 136a of the shaft, being secured thereto by a suitable collar 142 and locking nut 143. The bracket 138 is securely bolted by means of bolt members 145 to a belt spacer bracket 147 that is mounted upon and secured to a suitable pulley housing member 149 adjacent the motor shaft. For taking up any play in belts 132, a plurality of shims 151 are mounted between the opposed faces of brackets 138 and 147 so that a larger or smaller member can easily be positioned therebetween. It will be understood that the bracket 147 is mounted for rotation on suitable bearing portions 153 and 155 in the housing 149 so that the grinding wheel may be pivotally swung around this point. Thus it can be seen that at any desired lateral angle the drive to the grinding wheel is not disturbed by its position. A suitable guard 135 over the grinding wheel is carried by the bracket 138.

Means for raising and lowering the grinding wheel to engage and disengage work are provided (see Fig. 5). These means may include an arm 156 adapted to be suspended from a pivot 158, carried by a toggle member 160. The lower end of arm 156 is provided with a suitable opening 159 through which a bolt 162, carried by the bracket 138, may be fastened. The toggle mechanism may comprise a plurality of lazy tongs 162 and 164 pivotally connected at their upper end on a stud 166 carried by an arm 168 that is pivotally mounted upon stud 56 of the support member 50. Pairs of medial pivots are provided, 170 and 172, in a pair of brackets 173 and 174, positioned between the sets of toggle arms 162 and 164. The brackets 173 and 174 are screw-threaded in opposite directions to receive the screw-threaded portions 175 and 177 of a shaft member 178. This member is keyed to a hand wheel 180. Upon rotation of the hand wheel 180, due to the right and left hand thread used in brackets 173 and 174, movement of the handle in a clockwise manner will tend to spread the brackets 173 and 174, thus raising the grinding wheel W. Movement in a counter-clockwise manner will tend to move the pivots 158 and 166 apart, thus moving the grinding wheel downwardly. Means are also provided for assisting in the raising of the grinding wheel W. This means may comprise a coiled spring member 182 secured to an ear 183 on the housing 138 and an adjustable rod 185 supported by the member 50. A wing nut 186 is provided to determine the tension upon spring 182.

A power take-off for a flexible shaft is provided by means of the sheave 127. This is accomplished (see Figs. 13 and 14) by means of a friction cone member 201 securely fastened by screw members 203 and plate 204 on a hub 205 secured to a stub shaft 206. The shaft may extend through a suitable opening in the housing 149 and provide a power take-off for any desirable purpose at the end of a flexible shaft drive.

The shaft 206 is mounted in a supporting member 208 that is eccentrically mounted in a bracket 210. The bracket 210 may be supported by being fastened by suitable cap screws 212 to a reinforcing member 214 carried by the motor frame 22. The eccentric member 208 is provided with a handle 216 for rotation of the same to frictionally engage the friction disk 201 with the driven pulley member 127, or to disengage the same. The end of shaft 206 is connected in the usual manner by a splined tip 218 to a flexible drive shaft 220 which may have any desirable working tool attached to the end thereof. Suitable ballbearing members 222 and 224 support the shaft 206 in the bearing member 208.

From the above and foregoing explanation it will be obvious that applicant has provided a track grinding machine capable of easy and quick manipulation so that a grinding wheel can be raised and lowered against the track with the minimum of effort, can be shifted back and forth across the width of the track with a minimum of effort, and the entire grinding machine can be longitudinally moved back and forth with a minimum of effort. With a machine as constructed, I have found that where formerly two or three men were required to operate a track grinding device, one man can operate the above described machine, and he is capable of doing more work alone than has formerly been done by several operators with other machines that are not as easily handled.

It will be further obvious that it is a simple matter for the same man to pull the truck up upon the pivot which may be dropped where it is desired to use the same and revolve the entire assembly so that the grinding wheel can be used on the track on the opposite side of the machine.

I contemplate that various changes and modifications may be made in the exact details shown and I do not wish to be limited in any particular by the specific construction which I have shown. Rather, what I desire to secure and protect by Latters Patent of the United States is:

1. Apparatus of the class described comprising a rigid rectangular frame, a pair of parallel spaced axles supported thereby, wheels on both ends of both of said axles, a movable axle housing on each axle, a grinding wheel support frame carried by said housings, and a motor driven grinding wheel carried by said support frame, said support frame being capable of horizontal movement on said axles to provide a lateral adjustment for said grinding wheel.

2. Apparatus of the class described comprising a rigid rectangular frame, a pair of parallel spaced axles supported thereby, wheels on both ends of both of said axles, a movable axle housing on each axle, a grinding wheel support frame carried by said housings, and a motor driven grinding wheel carried by said support frame, said grinding wheel pivotally mounted for vertical movement, said support frame being capable of horizontal movement on said axles to provide a lateral adjustment for said grinding wheel.

3. Apparatus of the class described comprising a rigid rectangular frame, a pair of parallel spaced axles supported thereby, wheels on both ends of both of said axles, a reciprocally movable axle housing on each axle, extensible guards on each axle, spring means connected between said housings and said axles for assisting in moving said housings, a grinding wheel support frame carried by said housings, and a motor driven grinding wheel carried by said support frame, said support frame being capable of horizontal movement on said axles to provide a lateral adjustment for said grinding wheel.

4. A portable railway track grinding machine comprising a frame, a pair of parallel axles supported by said frame, traction wheels supporting said frame and arranged to travel on the rails to be ground, a motor supporting frame slidably mounted on said axles, a motor mounted upon said frame, a vertically positioned grinding wheel mounted on said motor support frame and driven by said motor and means associated with said grinding wheel for raising and lowering the same, said motor supporting frame slidably mounted on said axles in a direction to provide lateral movement of said grinding wheel.

5. A portable railway track grinding machine comprising a rigid frame constructed of hollow tubing welded together, two pairs of fixedly mounted bearings carried thereby, a pair of parallel axles supported in said bearings, traction wheels mounted on said axles, said traction wheels supporting said frame and arranged to travel on the rails to be ground, a motor supporting frame mounted on said axles, a motor thereon, said motor support frame including a pair of tubular members slidable on said axles, a vertically positioned grinding wheel mounted on said motor supporting frame and driven by said motor and means associated with said grinding wheel for raising and lowering the same, said motor supporting frame slidably mounted on said axles in a direction to provide lateral movement of said grinding wheel.

6. A portable railway track grinding machine comprising a rectangular frame, a pair of parallel axles supported by said frame, traction wheels mounted on said axles and supporting said frame and arranged to travel on the rails to be ground, a motor supporting frame slidably mounted on said axles, a motor mounted upon said frame, a vertically positioned pivotally mounted grinding wheel secured on said motor support frame, a flexible drive between said motor and said grinding wheel and means associated with said grinding wheel for raising and lowering the same, said means including a hand wheel, a screw rotatable thereby, toggle arms operated by said screw and spring means for opposing operation of said screw, said motor supporting frame slidably mounted on said axles in a direction to provide lateral movement of said grinding wheel.

7. A portable railway track grinding machine comprising a rigid frame having pairs of bearings in opposite ends thereof, a pair of parallel axles carried in said bearings, traction wheels mounted on said axles and adapted to support said frame, a secondary frame mounted upon said axles and capable of a sliding movement sideways thereon, means for locking said second frame to said first frame, a motor supported by said second frame, a drive shaft and pulley extended from one end of said motor, a grinding wheel, a pulley thereon, a flexible drive therefor extended from said motor, means for raising and lowering said grinding wheel and spring inertia means associated with said machine for assisting in to and fro movement of said machine during a grinding operation.

8. A rail grinder comprising a wheeled frame adapted to operate upon a railway track, said frame including a rigid cross structure, pairs of bearings thereon, axles supported in said bearings and a secondary frame mounted upon said axles, said secondary frame including a pair of axle housings shorter than said axles, extensible guards on both sides of said axle housings extending to said wheels, a motor on said secondary frame, a grinding wheel mounted on said secondary frame and driven by said motor, means associated with said grinding wheel for raising or lowering the same and inertia means associated with said wheeled frame for moving said wheeled frame and associated mechanism to and fro, said secondary frame slidably mounted on said axles in a direction to provide lateral movement of said grinding wheel.

9. A portable railway track grinding machine comprising a rigid frame having pairs of bearings in opposite ends thereof, a pair of parallel axles carried in said bearings, traction wheels mounted on said axles and adapted to support said frame, a secondary frame mounted upon said axles and capable of a sliding movement sideways thereon, means for locking said second frame to said first frame, a motor supported by said second frame, a drive shaft and pulley extended from one end of said motor, a flexible shaft, a drive therefor associated with said pulley, a grinding wheel, a pulley thereon, a flexible drive therefor extended from said motor pulley, means for raising and lowering said grinding wheel and spring inertia means associated with said machine for assisting in to and fro movement of said machine during a grinding operation.

10. A rail grinder comprising a wheeled frame adapted to operate upon a railway track, said frame including a rigid cross structure, pairs of bearings, axles supported in said bearings and a secondary frame mounted upon said axles, said secondary frame including a pair of axle housings shorter than said axles, extensible guards on both sides of said axle housings extending to said wheels, a motor on said secondary frame, a grinding wheel mounted on said secondary frame and driven by said motor, means associated with said grinding wheel for raising or lowering the same, coiled spring means associated with said frame for moving said frame and associated mechanism to and fro and pivot means located centrally of said secondary frame for raising said rail grinder to revolve the same, said secondary frame slidably mounted on said axles in a direction to provide lateral movement of said grinding wheel.

11. Apparatus of the class described comprising a frame including a pair of horizontal axle housings, a pair of axles in said housings, a lower frame for rigidly supporting said axles, wheels secured to the ends of said axles and a motor driven pivotally mounted grinding wheel carried by said frame, said frame being capable of horizontal movement on said axles to provide a lateral adjustment for said grinding wheel, coiled spring means associated with said wheels for assisting in moving said apparatus back and forth on rails to be ground and a pivot member for supporting said apparatus to revolve the same.

12. In apparatus of the class described the combination of a wheeled frame, a stationary plate carried by said frame, a coiled spring between said plate and one of the wheels of said frame, said spring having one end engaging said plate and one end engaging said wheel and means for locking said plate and wheel in operative engagement to coil and uncoil said spring by rotation clockwise and counterclockwise of said wheel.

13. In apparatus of the class described the combination of a wheeled frame, a disc carried by said frame, a plurality of openings around the periphery of said disc, a coiled spring between said plate and one of said wheels, said spring having one end engaging said plate and one end engaging said wheel and means engaging one of said openings for locking said plate and wheel in operative engagement to coil and uncoil said spring by rotation clockwise and counterclockwise of said wheel.

14. In apparatus of the class described, the combination of a wheeled frame, a disc carried by said frame, a plurality of openings around the periphery of said disc, a coiled spring between said plate and one of said wheels, said spring having one end engaging said plate and one end engaging said wheel and means engaging one of said openings for locking said plate and wheel in operative engagement to coil and uncoil said spring by rotation clockwise and counterclockwise of said wheel, said means including a lever pivotally mounted on said wheeled frame and a pin carried thereby and adapted to engage one of said openings to lock said plate to said frame in a non-rotative position.

15. In rail grinding mechanism the combination of a wheeled frame, a motor driven grinding wheel mounted thereon, means for raising and lowering said grinding wheel and for moving the same back and forth across the face of a rail to be ground, and means associated with said frame for utilizing the momentum of longitudinal movement thereof to oscillate the same back and forth, said means comprising a spring member capable of being loaded and unloaded by the back and forth movement of the frame.

16. In rail grinding mechanism the combination of a wheeled frame, a motor driven grinding wheel mounted thereon, means for raising and lowering said grinding wheel and for moving the same back and forth across the face of a rail to be ground, and means associated with said frame for utilizing the momentum of longitudinal movement to oscillate the same back and forth, said means comprising a spring member capable of being loaded and unloaded by the back and forth movement of the frame, said spring being fastened between one of the wheels of said frame and a non-rotating portion of said frame.

17. In apparatus of the class described, the combination of a wheel, a handwheel secured to the outer side of said wheel, a frame and axle supporting said wheel, a disk member loosely mounted on said axle, a spring member having its ends secured to said wheel and said disk, and means associated with said frame for locking said disk to said frame, said means comprising a lever, a pin carried thereby and a plurality of openings in said disk for receiving said pin.

18. In apparatus of the class described, the combination of a wheel, a frame member, an axle therein supporting said wheel, coiled spring means connected between said wheel and said frame for moving said frame and wheel back and forth upon a rail, and manually operated means for releasing said connection.

19. In apparatus of the class described, the combination of a wheel, a frame member, an axle therein supporting said wheel, and coiled spring means connected between said wheel and said frame for moving said frame and wheel back and forth upon a rail.

20. In apparatus of the class described, the combination of a wheel, a handwheel secured to the outer side of said wheel, a frame and axle supporting said wheel, a disk member loosely mounted on said axle, a peripheral row of openings in said disk member, a spring member having its ends secured to said wheel and said disk, and pin means associated with said frame and adapted to enter one of said openings for locking said disk to said frame.

21. In apparatus of the class described, the combination of a wheel, a handwheel secured to the outer side of said wheel, a frame and axle supporting said wheel, a disk member loosely mounted on said axle, a spring member having its ends secured to said wheel and said disk, and means associated with said frame for locking said disk to said frame.

ARTHUR WILLIAM MALL.